US012637838B2

(12) United States Patent　　　　(10) Patent No.:　US 12,637,838 B2

Tsutsumi et al.　　　　　　　　　　　(45) Date of Patent:　May 26, 2026

(54) CONTROL DEVICE FOR WHEEL LOADER

(71) Applicant: Hitachi Construction Machinery Co., Ltd., Tokyo (JP)

(72) Inventors: Yoshiaki Tsutsumi, Ishioka (JP); Shinya Imura, Toride (JP); Hidekazu Moriki, Mito (JP); Kazuya Sekine, Mito (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 28 days.

(21) Appl. No.: 18/687,451

(22) PCT Filed: Mar. 22, 2023

(86) PCT No.: PCT/JP2023/011062
§ 371 (c)(1),
(2) Date: Feb. 28, 2024

(87) PCT Pub. No.: WO2023/182320
PCT Pub. Date: Sep. 28, 2023

(65) Prior Publication Data
US 2024/0360648 A1　　Oct. 31, 2024

(30) Foreign Application Priority Data

Mar. 24, 2022　(JP) ................................. 2022-047877

(51) Int. Cl.
*E02F 9/20*　　　(2006.01)
*B60W 30/02*　　(2012.01)
(Continued)

(52) U.S. Cl.
CPC ........... *E02F 9/2083* (2013.01); *B60W 30/02* (2013.01); *E02F 3/16* (2013.01); *E02F 3/43* (2013.01);
(Continued)

(58) Field of Classification Search
CPC ... E02F 9/2083; E02F 3/16; E02F 3/43; E02F 3/434; E02F 9/2041; E02F 9/2253;
(Continued)

(56) References Cited

U.S. PATENT DOCUMENTS

| | | |
|---|---|---|
| 5,865,512 A | 2/1999 | Meiser et al. |
| 10,041,229 B2 | 8/2018 | Cai et al. |

(Continued)

FOREIGN PATENT DOCUMENTS

| | | |
|---|---|---|
| CN | 105518255 A | 4/2016 |
| CN | 108779622 A | 11/2018 |

(Continued)

OTHER PUBLICATIONS

Extended European Search Report issued in European Application No. 23774915.5 dated Jun. 18, 2025 (5 pages).

(Continued)

*Primary Examiner* — Sohana Tanju Khayer
(74) *Attorney, Agent, or Firm* — Crowell & Moring LLP

(57)　　　　　　ABSTRACT

Provided is a control device for a wheel loader that is capable of improving the productivity of excavation work by reducing the work time required for the excavation work. A control device 120 is a control device for a wheel loader 1 that excavates a target by moving a vehicle body 2 forward with rotation of wheels 5f, 5r to plunge a bucket 3 into the target. The control device 120 moves the vehicle body 2 forward with the bucket 3 plunged into the target, and brakes the wheels 5f, 5r when a rotational speed of the wheels 5f, 5r exceeds a predetermined threshold BS.

9 Claims, 7 Drawing Sheets

(51) Int. Cl.

| | | |
|---|---|---|
| *E02F 3/16* | (2006.01) |
| *E02F 3/43* | (2006.01) |
| *E02F 9/22* | (2006.01) |

(52) U.S. Cl.

CPC ............ *E02F 3/434* (2013.01); *E02F 9/2041* (2013.01); *E02F 9/2253* (2013.01); *B60W 2300/17* (2013.01); *B60Y 2200/415* (2013.01); *E02F 9/226* (2013.01)

(58) Field of Classification Search

CPC ........... E02F 9/226; E02F 9/0841; E02F 9/22; B60W 30/02; B60W 2300/17; B60W 30/14; B60Y 2200/415

See application file for complete search history.

(56) References Cited

U.S. PATENT DOCUMENTS

| | | | |
|---|---|---|---|
| 12,098,516 | B2 * | 9/2024 | Onodera ............... E02F 9/2235 |
| 12,491,862 | B2 * | 12/2025 | Zhao ..................... B60W 30/02 |
| 2009/0326769 | A1 * | 12/2009 | Oshima ................. B60W 30/02 |
| | | | 701/84 |
| 2015/0139767 | A1 * | 5/2015 | Moriki .................... E02F 3/431 |
| | | | 414/699 |
| 2016/0230369 | A1 | 8/2016 | Kaneko et al. |
| 2017/0121946 | A1 * | 5/2017 | Cai .......................... E02F 9/261 |
| 2018/0010320 | A1 * | 1/2018 | Yoshikawa .......... B62D 11/003 |
| 2018/0079404 | A1 * | 3/2018 | Kaneko ................. B60W 20/00 |
| 2019/0100899 | A1 | 4/2019 | Kimura et al. |
| 2019/0161940 | A1 * | 5/2019 | Takeda ................. E02F 9/2079 |
| 2020/0277750 | A1 | 9/2020 | Heo et al. |
| 2021/0137018 | A1 * | 5/2021 | De Leener .......... A01F 15/0841 |
| 2021/0355651 | A1 * | 11/2021 | Itoh ........................... E02F 3/32 |
| 2022/0016949 | A1 * | 1/2022 | Graus ................... B60G 17/08 |
| 2022/0314986 | A1 * | 10/2022 | Bando ................. G05D 1/0223 |
| 2022/0348184 | A1 * | 11/2022 | Hiroi ............... B60W 30/18172 |
| 2023/0235535 | A1 * | 7/2023 | Eastman ............... E02F 9/2253 |
| | | | 701/50 |
| 2023/0304255 | A1 * | 9/2023 | Oasa ........................ E02F 9/261 |
| 2023/0320246 | A1 * | 10/2023 | Kodama ................ A01B 76/00 |
| | | | 701/26 |
| 2024/0017704 | A1 * | 1/2024 | Ozawa .................. B60T 8/1763 |
| 2024/0026654 | A1 * | 1/2024 | Satoh ........................ E02F 9/26 |
| 2024/0059264 | A1 * | 2/2024 | Leibbrand ............ B60T 8/1708 |
| 2024/0200303 | A1 * | 6/2024 | Kim ........................ E02F 3/434 |
| 2024/0301657 | A1 * | 9/2024 | Sonoda ................. E02F 9/2045 |
| 2024/0331369 | A1 * | 10/2024 | Lee ......................... G06V 20/58 |
| 2024/0361764 | A1 * | 10/2024 | Lacaze .................... B66F 9/063 |
| 2024/0369524 | A1 * | 11/2024 | Artan ...................... G06N 3/09 |

FOREIGN PATENT DOCUMENTS

| | | | |
|---|---|---|---|
| JP | 62-185928 | A | 8/1987 |
| JP | 10-88622 | A | 4/1998 |
| JP | 2008-133657 | A | 6/2008 |
| JP | 2015-129395 | A | 7/2015 |
| JP | 2017-210816 | A | 11/2017 |
| KR | 10-2020-0105024 | A | 9/2020 |

OTHER PUBLICATIONS

International Search Report (PCT/ISA/210) issued in PCT Application No. PCT/JP2023/011062 dated May 16, 2023, with English translation (6 pages).

Japanese-language Written Opinion (PCT/ISA/237) issued in PCT Application No. PCT/JP2023/011062, dated May 16, 2023, with English translation (6 pages).

Korean-language Office Action issued in Korean Application No. 10-2024-7005679 dated Jan. 28, 2026 (6 pages).

Chinese-language Office Action issued in Chinese Application No. 202380013362.1 dated Apr. 7, 2026 (8 pages).

* cited by examiner

Fig. 3

CONTROL DEVICE FOR WHEEL LOADER

TECHNICAL FIELD

The present invention relates to a control device for a wheel loader.

BACKGROUND ART

Wheel loaders are work machines and the derivatives that travel with four-wheel drive wheels and are steered in a middle-folded manner. A work device such as a bucket that scoops a target such as soil and sand on the ground is coupled to a front portion of a vehicle body of such a wheel loader. A control device for the wheel loader controls the height and angle of the bucket and the vehicle speed and direction of the vehicle body in accordance with an operation by an operator on board an operation room. In this manner, the wheel loader can perform excavation work to excavate the target with the bucket, transport work to move the target loaded on the bucket to a dump truck bed, and loading work to discharge the target from the bucket to the dump truck bed.

In the excavation work, a travel operation to accelerate to move the vehicle body forward from a posture with the bucket, which is substantially parallel to the ground surface, moved closer to the ground surface, by an operation of an acceleration pedal or the like, so as to cause the bucket to be plunged into the target, and an excavation operation to scoop the target after the bucket is plunged into the target are performed. In the excavation operation, after the bucket is plunged into the target, the vehicle body is moved forward while adjusting the rotating amount of the wheels by the operation of the acceleration pedal or the like. Simultaneously, in the excavation operation, lifting of moving the bucket upward is performed by operating a lift operation lever or the like, and the bucket is rotated (tilted) in a crowding direction by operating a bucket operation lever or the like. In this manner, the target is contained in the bucket and the bucket is brought into a loaded state.

To simplify a series of such operations of the excavation work, Patent Literature 1 discloses an automatic excavation technique of performing lifting and rotating in a crowding direction of the bucket with full acceleration. Further, Patent Literature 2 discloses a technique, based on Patent Literature 1 as prior art, in which when a wheel loader approaches an excavation start position, the tilting rate of a traveling hydraulic motor is decreased while increasing the engine speed so that the impact at the time of starting the excavation operation (at the time of plunging into a target) is suppressed by decreasing the vehicle speed. Further, Patent Literature 3 discloses a technique, based on Patent Literature 2 as prior art, in which the speed stage of the transmission is shifted to the low speed, instead of decreasing the tilting rate of the traveling hydraulic motor so as to suppress the impact at the time of starting the excavation operation, and applicable models have been enhanced.

CITATION LIST

Patent Literature

Patent Literature 1: JP S62-185928 A
Patent Literature 2: JP 2008-133657 A
Patent Literature 3: U.S. Pat. No. 10,041,229 A1

SUMMARY OF INVENTION

Technical Problem

However, in the techniques disclosed in Patent Literature 2 and Patent Literature 3, the vehicle speed is decelerated before starting the excavation operation to suppress the impact at the time of starting the excavation operation. Thus, in the techniques disclosed in Patent Literature 2 and Patent Literature 3, the work time required for the excavation work increases, which could lower the productivity of the excavation work. In addition, the technique disclosed in Patent Literature 1 does not consider reducing the work time required for the excavation work and thus needs to be further improved.

In view of the aforementioned circumstances, the present invention provides a control device for a wheel loader capable of improving the productivity of excavation work by reducing the work time required for the excavation work.

Solution to Problem

To solve the aforementioned problem, a control device for a wheel loader according to the present invention is a control device for a wheel loader that excavates a target by moving a vehicle body forward with rotation of wheels to plunge a bucket into the target, and the control device moves the vehicle body forward with the bucket plunged into the target, and brakes the wheels when a rotational speed of the wheels exceeds a predetermined threshold.

Advantageous Effects of Invention

According to the present invention, a control device for a wheel loader can be provided that is capable of improving the productivity of excavation work by reducing the work time required for the excavation work.

BRIEF DESCRIPTION OF DRAWINGS

FIG. 3 is a block diagram showing the functional configuration of a control device of Embodiment 1.

DESCRIPTION OF EMBODIMENTS

Hereinafter, embodiments of the present invention will be described with reference to the drawings. The components assigned the same reference signs in the embodiments have the same functions in the embodiments, unless otherwise particularly mentioned, and the descriptions will be omitted.

Embodiment 1

Using FIG. 1 to FIG. 4, a control device 120 for a wheel loader 1 according to Embodiment 1 will be described.

Figure 1A:
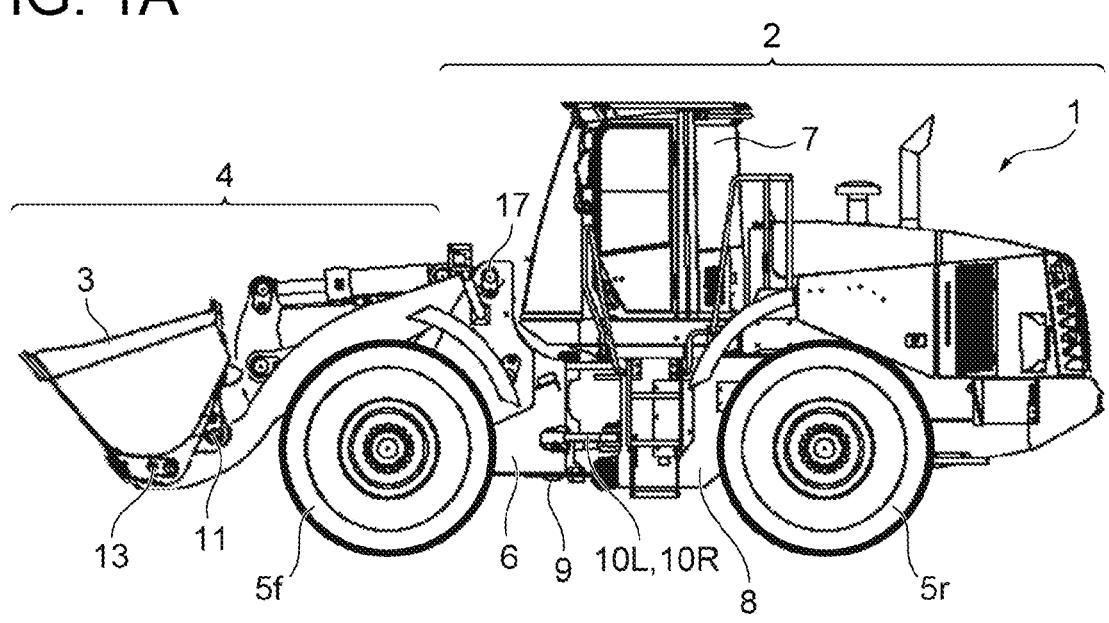
FIG. 1A is a side view showing an outer appearance of a wheel loader.
Figure 1B:
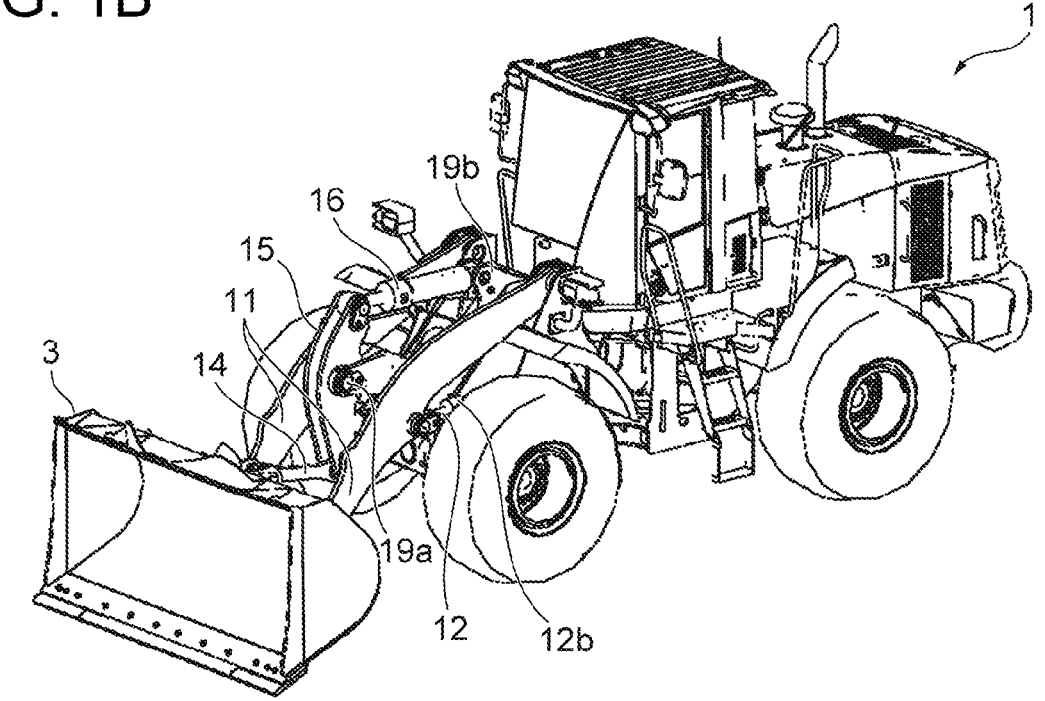
FIG. 1B is a perspective view of FIG. 1A.

FIG. 1A is a side view showing an outer appearance of the wheel loader 1. FIG. 1B is a perspective view of FIG. 1A.

The wheel loader 1 is a work machine or the derivative that travels with four-wheel drive wheels 5*f*, 5*r* and steered in a middle-folded manner. A work device 4 such as a bucket 3 that scoops a target such as soil and sand on the ground is coupled to a front portion of a vehicle body 2 of the wheel loader. A control device 120 for the wheel loader 1 controls the height and angle (i.e., the posture of the bucket 3) of the bucket 3 and the vehicle speed and direction of the vehicle body 2 in accordance with an operation by an operator on board an operation room 7. In this manner, the wheel loader 1 can perform excavation work to excavate the target with the bucket 3, transport work to move the target loaded on the bucket 3 to a dump truck bed, and loading work to discharge the target from the bucket 3 to the dump truck bed.

The vehicle body 2 includes a front frame 6 having the device 4 and the front wheels 5*f*, and a rear frame 8 having the rear wheels 5*r*, the operation room 7, and an engine 100. The front frame 6 and the rear frame 8 are coupled together bendably in the left-right direction by a center pin 9, and are configured such that the bending angle can be changed by steering cylinders 10L, 10R provided on the left and right of the center pin 9. The vehicle body 2 is steered by expanding and contracting the cylinders 10L, 10R during traveling to change the angle (bending angle) of the front frame 6 relative to the rear frame 8.

The work device 4 includes a lift arm 11 rotatably coupled to the front frame 6 and the bucket 3 rotatably coupled to the lift arm 11.

The lift arm 11 is coupled to the lift cylinder 12. The lift cylinder 12 is coupled to the front frame 6 such that the front frame 6 can support the load of the bucket 3 coupled to the lift arm 11. The lift cylinder 12 performs lifting to raise the height of the bucket 3 by rotating the lift arm 11 upward and lowering to lower the height of the bucket 3 by rotating the lift arm 11 downward. A lift cylinder pressure sensor 12*b* to measure the pressure in a bottom room of the lift cylinder 12 is attached to the lift cylinder 12. The attachment position of the lift cylinder pressure sensor 12*b* is not particularly limited as long as it can measure the same pressure as the pressure in the bottom room of the lift cylinder 12.

The bucket 3 is rotatably coupled to the lift arm 11 at a supporting point 13. The supporting point 13 is connected to a bucket cylinder 16 via a push rod 14 and a bell crank 15 such that an angle of the bucket 3 relative to the lift arm 11 can be changed. The bucket cylinder 16 is coupled to the front frame 6 at a supporting point 17. The height of the bucket 3 can be changed with the expansion and contraction of the lift cylinder 12. The angle of the bucket 3 can be changed with the expansion and contraction of the bucket cylinder 16. A bell crank angle sensor 19*a* and a lift arm angle sensor 19*b* are attached to the work device 4 such that the height and angle (i.e., the posture of the bucket 3) of the bucket 3 can be calculated from known dimensions.

Figure 2:
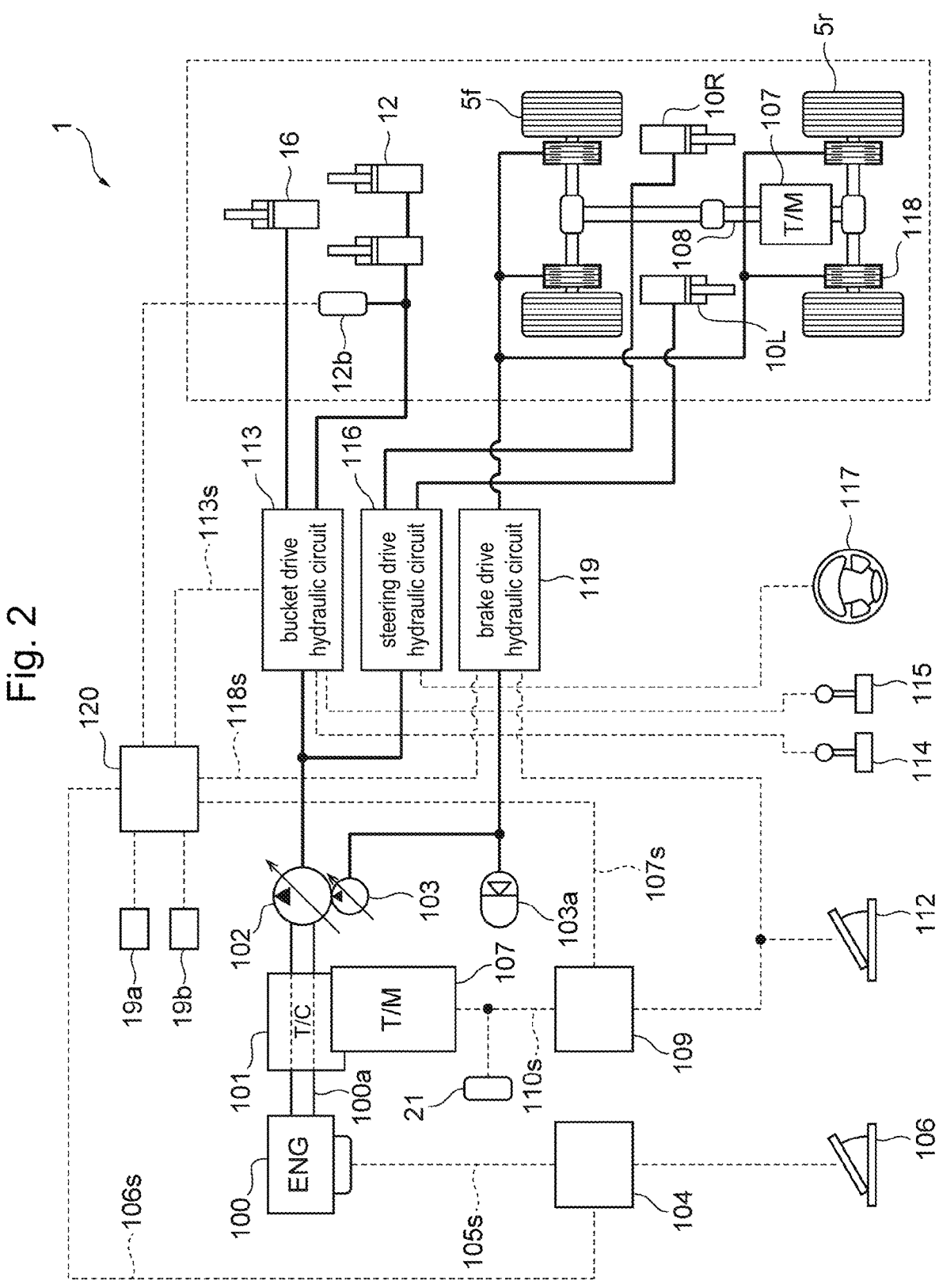
FIG. 2 is a system diagram of the wheel loader shown in FIG. 1A.

FIG. 2 is a system diagram of the wheel loader 1 shown in FIG. 1A.

An output shaft 100*a* of the engine 100 as a power source for the wheels 5*f*, 5*r* is directly connected to a torque converter 101, a hydraulic pump 102, and a brake pump 103. The engine speed of the engine 100 is controlled with an electric signal 105*s* of an engine controller 104. The engine controller 104 controls the engine speed of the engine 100 in accordance with a depression amount of an acceleration pedal 106 or an electric signal 106*s* of the control device 120.

An output shaft of the torque converter 101 is connected to a drive shaft 108 via a transmission 107 and drives the wheels 5*f*, 5*r*. The torque converter 101 has a structure in which as the engine speed of the engine 100 increases relative to the output engine speed of the torque converter 101, the power transmitted to the transmission 107 increases. The power output from the torque converter 101 increases as the depression amount of the acceleration pedal 106 increases to thus increase the engine speed of the engine 100.

The transmission 107 cuts connection between the output shaft of the torque converter 101 and the drive shaft 108 and reverses the rotating direction of the drive shaft 108, with an electric signal 110*s* of the transmission controller 109. The transmission 107 transmits the power from the engine 100 to the wheels 5*f*, 5*r*, together with the torque converter 101 and the drive shaft 108. When the connection between the output shaft of the torque converter 101 and the drive shaft 108 is cut, the transmission of the power from the engine 100 to the wheels 5*f*, 5*r* is cut, which decreases the drive power of the wheels 5*f*, 5*r*. When the rotating direction of the drive shaft 108 is reversed, the direction of the drive power for the wheels 5*f*, 5*r* is reversed, so that the rotating direction of the wheels 5*f*, 5*r* is reversed. When the depression amount of the brake pedal 112 is constant or in accordance with an electric signal 107*s* of the control device 120, the transmission controller 109 outputs an electric signal 110*s* with which the connection between the output shaft of the torque converter 101 and the drive shaft 108 is cut. A speed sensor 21 is attached to the transmission 107. The speed sensor 21 measures the rotational speed of the wheels 5*f*, 5*r* from the number of rotation of the drive shaft 108. The speed sensor 21 can measure the vehicle speed of the vehicle body 2 by calculating the moving amount per unit time of the vehicle body 2 from the rotational speed of the wheels 5*f*, 5*r* and the dimensions of the wheels 5*f*, 5*r*.

The hydraulic pump 102 ejects the pressure oil in a given amount at each rotation of the output shaft 100*a* of the engine 100. The pressure oil ejected from the hydraulic pump 102 is supplied to each of the lift cylinder 12 and the bucket cylinder 16 via a bucket drive hydraulic circuit 113. The lift cylinder 12 and the bucket cylinder 16 each expand and contract with the pressure oil from the bucket drive hydraulic circuit 113. Since the amount of the pressure oil ejected from the hydraulic pump 102 increases as the engine speed of the engine 100 increases, when the depression amount of the acceleration pedal 106 is increased to thereby increase the engine speed of the engine 100, the expansion and contraction speed of the lift cylinder 12 and the bucket cylinder 16 is accelerated.

The bucket drive hydraulic circuit 113 cuts the supply of the pressure oil from the hydraulic pump 102 to the lift cylinder 12 or reverses the expansion and contraction direction of the lift cylinder 12 in accordance with the operation of a lift operation lever 114 by the operator or an electric signal 113*s* of the control device 120. When the supply of the pressure oil from the hydraulic pump 102 to the lift cylinder 12 is cut, the rotating operation of the lift arm 11 stops. When the expansion and contraction direction of the lift cylinder 12 is reversed, the upward and downward rotating direction of the lift arm 11 is switched.

The bucket drive hydraulic circuit 113 cuts the supply of the pressure oil from the hydraulic pump 102 to the bucket cylinder 16 or reverses the expansion and contraction direction of the bucket cylinder 16 in accordance with the operation of a bucket operation lever 115 by the operator or the electric signal 113*s* of the control device 120. When the supply of the pressure oil from the hydraulic pump 102 to the bucket cylinder 16 is cut, the rotating operation of the bucket 3 stops. When the expansion and contraction direction of the bucket cylinder 16 is reversed, the rotate direction in a dumping or a crowding direction of the bucket 3 is switched.

The pressure oil ejected from the hydraulic pump 102 is supplied to the steering cylinders 10L, 10R via a steering drive hydraulic circuit 116. The steering cylinders 10L, 10R expand and contract with the pressure oil from the steering drive hydraulic circuit 116.

The steering drive hydraulic circuit 116 expands and contracts the steering cylinders 10L, 10R in accordance with the operation of a steering wheel 117 by the operator. For example, when the steering wheel 117 is rotated to the right, the steering drive hydraulic circuit 116 supplies the pressure oil ejected from the hydraulic pump 102 such that the right steering cylinder 10R contracts and the left steering cylinder 10L expands. In this manner, the vehicle body 2 is steered so as to make a right turn. For example, when the steering wheel 117 is rotated to the left, the steering drive hydraulic circuit 116 supplies the pressure oil ejected from the hydraulic pump 102 such that the right steering cylinder 10R expands and the left steering cylinder 10L contracts. In this manner, the vehicle body 2 is steered so as to make a left turn.

The pressure oil ejected from the brake pump 103 is accumulated in an accumulator 103a. The pressure oil accumulated in the accumulator 103a is supplied to a brake 118 as a brake device that brakes the wheels 5f, 5r via a brake drive hydraulic circuit 119.

The brake drive hydraulic circuit 119 controls the brake pressure applied to the wheels 5f, 5r in accordance with the depression amount of the brake pedal 112 by the operator or an electric signal 118s from the control device 120. When the brake pressure applied to the wheels 5f, 5r increases, the brake force to the wheels 5f, 5r increases, and thus, the rotational speed of the wheels 5f, 5r decelerates, thereby decelerating the vehicle speed of the vehicle body 2.

Figure 3:
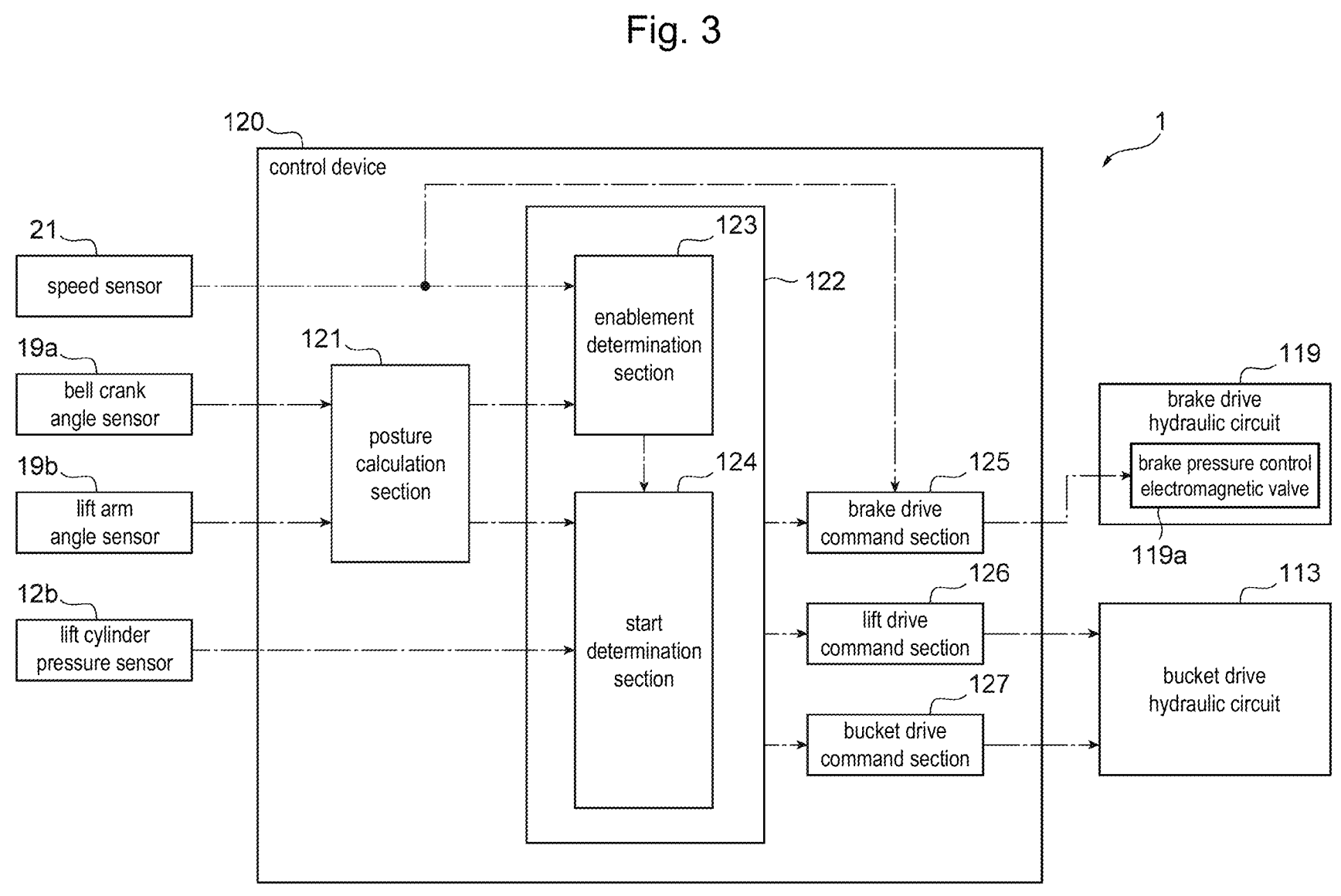

FIG. 3 is a block diagram showing the functional configuration of the control device 120 of Embodiment 1.

In the excavation work, the wheel loader 1 performs a travel operation to move the vehicle body 2 forward from the excavation posture with the bucket 3, which is substantially parallel to the ground surface, moved closer to the ground surface so as to cause the bucket 3 to be plunged into a target, and an excavation operation to scoop the target by means of the bucket 3 plunged into the target.

The control device 120 performs automatic excavation processing in which the traveling of the vehicle body 2 and the posture of the bucket 3 are controlled to automatically perform the excavation operation in the excavation work. The excavation operation performed by the automatic excavation processing in the present embodiment is the operation in which lifting of the bucket 3 is started while moving the vehicle body 2 forward and the brake 118 is driven so as not to slip the wheels 5f, 5r (in other words, after braking the wheels 5f, 5r), and then, the bucket 3 is rotated in a crowding direction to be brought into a loaded state, and when the bucket 3 has reached a predetermined height, the lifting is stopped.

Note that the control device 120 may perform automatic travel processing in which the traveling of the vehicle body 2 and the posture of the bucket 3 are controlled to automatically perform the travel operation in the excavation work. The travel operation performed by the automatic travel processing in the present embodiment is the operation in which the bucket 3 is moved closer to the ground surface in substantially parallel to the ground surface to be brought into the excavation posture, and the vehicle body 2 is moved forward while maintaining the vehicle speed of the vehicle body 2 at a predetermined speed or greater to cause the bucket 3 to be plunged into a target. The predetermined speed is, for example, 2 km/h. In this manner, since the control device 120 does not decelerate the vehicle speed of the vehicle body 2 before the bucket 3 is plunged into the target, the time required for the travel operation in the excavation work can be reduced.

For performing the automatic excavation processing, the control device 120 acquires the rotational speed of the wheels 5f, 5r (and the vehicle speed of the vehicle body 2) measured by the speed sensor 21. The control device 120 acquires the angle of the bell crank 15 measured by the bell crank angle sensor 19a. The control device 120 acquires the angle of the lift arm 11 measured by the lift arm angle sensor 19b. The control device 120 acquires the pressure of the lift cylinder 12 (pressure of the bottom room) measured by the lift cylinder pressure sensor 12b. Then, the control device 120 outputs the electric signal 118s indicating a control command to the brake drive hydraulic circuit 119 and outputs the electric signal 113s indicating a control command to the bucket drive hydraulic circuit 113 based on these pieces of acquired information.

The control device 120 includes a posture calculation section 121, an automatic excavation processing section 122, a brake drive command section 125, a lift drive command section 126, and a bucket drive command section 127.

The posture calculation section 121 calculates a claw tip angle and height of the bucket 3 based on the angles of the bell crank 15 and the lift arm 11 that are respectively measured by the bell crank angle sensor 19a and the lift arm angle sensor 19b. The claw tip angle of the bucket 3 is an angle formed by a bottom surface of the bucket 3 and the ground surface.

The automatic excavation processing section 122 performs necessary processing for starting the automatic excavation processing. The automatic excavation processing section 122 includes an enablement determination section 123 that determines whether the automatic excavation processing is enabled, and a start determination section 124 that determines whether to start the automatic excavation processing.

The enablement determination section 123 determines whether the automatic excavation processing is enabled based on the rotational speed of the wheels 5f, 5r measured by the speed sensor 21 and the calculation result of the posture calculation section 121. The automatic excavation processing being enabled means a state in which when the bucket 3 is plunged into a target with the wheel loader 1 remaining at a current state and the automatic excavation processing is started, the excavation operation is expected to be appropriately performed. The start determination section 124 determines whether to start the automatic excavation processing based on the determination result of the enablement determination section 123, the calculation result of the posture calculation section 121, and the pressure of the lift cylinder 12 measured by the lift cylinder pressure sensor 12b.

When the start determination section 124 determines to start the automatic excavation processing, the automatic excavation processing section 122 may create an operation plan for the automatic excavation processing. Alternatively, in this case, the automatic excavation processing section 122 may read the operation plan for the automatic excavation processing that is created and stored in advance. The operation plan may be, for example, the transition of target values for the rotational speed of the wheels 5f, 5r (and the vehicle speed of the vehicle body 2) and the angle and height of the bucket 3 (claw tip angle). The transition of the target values for the angle and height of the bucket 3 is a trajectory of the target operation of the bucket 3. The automatic excavation processing section 122 may output the operation plan to the brake drive command section 125, the lift drive command section 126, and the bucket drive command section 127.

The brake drive command section 125 calculates the brake pressure to be applied to the wheels 5f, 5r based on the rotational speed of the wheels 5f, 5r measured by the speed sensor 21 and the output from the automatic excavation processing section 122, and generates a control command to a brake pressure control electromagnetic valve 119a. The brake drive command section 125 generates the electric signal 118s indicating the generated control command and outputs the electric signal 118s to the brake pressure control electromagnetic valve 119a of the brake drive hydraulic circuit 119.

The lift drive command section 126 calculates the expansion and contraction amount of the lift cylinder 12 based on the output from the automatic excavation processing section 122 and generates a control command to the bucket drive hydraulic circuit 113. The lift drive command section 126 generates the electric signal 113s indicating the generated control command and outputs the electric signal 113s to the bucket drive hydraulic circuit 113.

The bucket drive command section 127 calculates the expansion and contraction amount of the bucket cylinder 16 based on the output from the automatic excavation processing section 122 and generates a control command to the bucket drive hydraulic circuit 113. The bucket drive command section 127 generates the electric signal 113s indicating the generated control command and outputs the electric signal 113s to the bucket drive hydraulic circuit 113.

Figure 4:
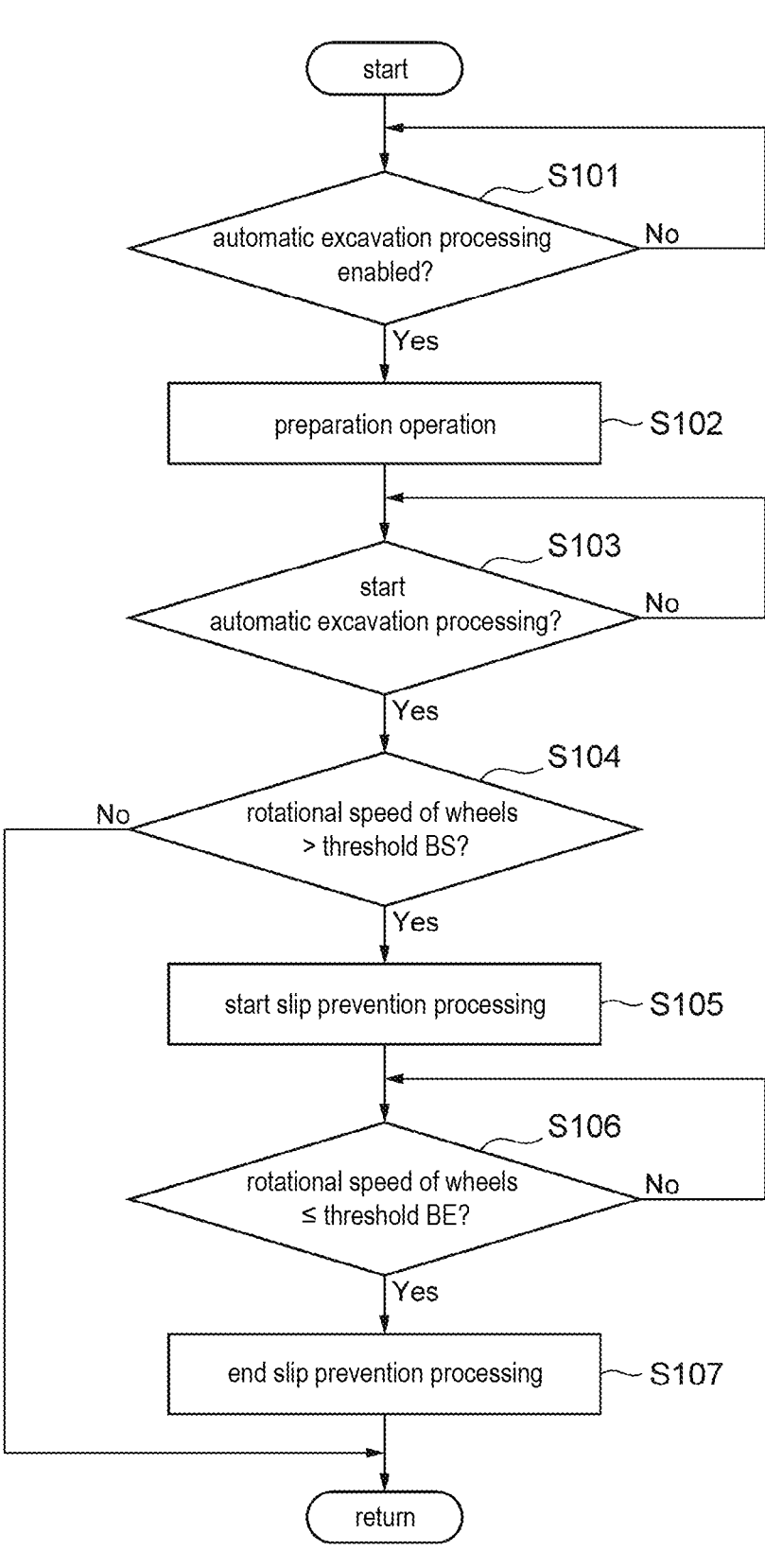
FIG. 4 is a flowchart showing processing performed by the control device shown in FIG. 3.

FIG. 4 is a flowchart showing the processing performed by the control device 120 shown in FIG. 3.

In step S101, the control device 120 determines whether the automatic excavation processing is enabled using the enablement determination section 123. When the enablement determination section 123 determines that the automatic excavation processing is enabled, the control device 120 moves on to step S102. When the enablement determination section 123 determines that the automatic excavation processing is not enabled, the control device 120 repeats step S101, for example, every second until the automatic excavation processing is determined to be enabled.

The enablement determination section 123 determines that the automatic excavation processing is enabled when the bucket 3 is in an excavation posture to be within a predetermined range and the vehicle body 2 is moving forward. The excavation posture of the bucket 3 within a predetermined range means that the bucket 3 is in a posture substantially parallel (claw tip angle within 10°) to the ground surface and with the height of the bucket 3 around the ground surface. The vehicle body 2 moving forward may mean that the vehicle speed of the vehicle body 2 is equal to or greater than a predetermined speed. The predetermined speed is, for example, 2 km/h.

In step S102, the control device 120 causes the wheel loader 1 to perform preparation operation for the automatic excavation processing, using the automatic excavation processing section 122, before the start determination section 124 determines whether to start the automatic excavation processing in step S103.

The preparation operation for the automatic excavation processing means that, for example, the pressure oil is supplied, in advance, to either the bottom room or the rod room of the lift cylinder 12, which rotates the lift arm 11 upward, within a range in which the lift cylinder 12 does not actually expand or contract. In this manner, the control device 120 can move, in advance, the position of a proportional solenoid valve included in the bucket drive hydraulic circuit 113 to the side where the lift arm 11 is rotated upward relative to a neutral position before the start determination section 124 determines whether to start the automatic excavation processing. The control device 120 can reduce the response time of the lift cylinder 12 after the start determination section 124 determines to start the automatic excavation processing until the lift cylinder 12 actually expands or contracts. Therefore, since the control device 120 can immediately start lifting the bucket 3 performed in the automatic excavation processing, the time required for the excavation operation in the excavation work can be reduced.

In addition to the aforementioned matters, the preparation operation for the automatic excavation processing may be to notify, in advance, the operator or workers nearby of the start of the automatic excavation processing by means of sounding a buzzer, lighting a lamp, or displaying on a monitor provided in the wheel loader 1, for example. In this manner, since for the operator or workers nearby, the automatic excavation processing is not abruptly started, the phycological impact on the operator or workers nearby can be mitigated.

In step S103, the control device 120 determines whether to start the automatic excavation processing, using the start determination section 124. When the start determination section 124 determines to start the automatic excavation processing, the control device 120 starts the automatic excavation processing and moves on to step S104. When the start determination section 124 does not determine to start the automatic excavation processing, the control device 120 repeats step S103, for example, every second until the automatic excavation processing is determined to start.

The start determination section 124 determines to start the automatic excavation processing when the enablement determination section 123 determines that the automatic excavation processing is enabled, the bucket 3 is in an excavation posture, and the pressure of the lift cylinder 12 that performs lifting of the bucket 3 has changed to exceed a predetermined pressure. The criterion for determining whether the bucket 3 is in the excavation posture may be the same as that of step S101. The predetermined pressure as a criterion for determining the pressure of the lift cylinder 12 may be a value greater than the pressure of the lift cylinder 12 when the bucket 3 moves forward with an empty load and a value smaller than the pressure of the lift cylinder 12 that increases due to the impact received from the target when the bucket 3 is plunged into the target. The lower limit of the predetermined pressure as the criterion for determining the pressure of the lift cylinder 12 is set to be the pressure of the lift cylinder 12 when the bucket 3 moves forward with an empty load because it is already determined in step S101 that the bucket 3 is moving forward in the excavation posture. That is, when the bucket 3 moves forward in the excavation posture, since the bucket 3 moves forward in a posture substantially parallel to the ground surface, even if the bucket 3 is in a loaded state, a lot of targets fall from the bucket 3. When the bucket 3 moves forward in the excavation posture, it is normally inconceivable that the bucket 3 maintains the loaded state. Therefore, it is reasonable that the lower limit of the predetermined pressure as the criterion for determining the pressure of the lift cylinder 12 is set to be the pressure of the lift cylinder 12 when the bucket 3 moves forward with an empty load.

When the start determination section 124 determines to start the automatic excavation processing, the control device 120 starts the automatic excavation processing. Specifically, the control device 120 starts lifting the bucket 3 plunged into the target while moving the vehicle body 2 forward, as the automatic excavation processing. At this time, the control device 120 rotates the wheels 5f, 5r such that the vehicle body 2 moves forward even receiving the reaction force from the bucket 3 plunged into the target. The rotational speed of the wheels 5f, 5r may be maintained by the control device 120 at a threshold BE or greater, which will be described later. For the detailed control contents on lifting the bucket 3, for example, the technique disclosed in Patent Literature 1 can be applied.

Further, to prevent a malfunction of the automatic excavation processing being started while the wheel loader 1 is at a stop, the control device 120 may move on to step S101 again when the vehicle speed of the vehicle body 2 becomes lower than a predetermined speed (for example, 2 km/h) in step S103. Further, the control device 120 may repeat step S101, for example, every second until the automatic excavation processing is determined to be enabled.

In step S104, the control device 120 determines whether the rotational speed of the wheels 5f, 5r exceeds a threshold BS. When the rotational speed of the wheels 5f, 5r exceeds the threshold BS, the control device 120 moves on to step S105. When the rotational speed of the wheels 5f, 5r is equal to or smaller than the threshold BS, the control device 120 rotates the bucket 3 in the crowding direction to bring the bucket 3 into a loaded state and stops lifting. Thereafter, the control device 120 ends the processing shown in FIG. 4.

The threshold BS is a predetermined threshold to prevent slipping of the wheels 5f, 5r. The threshold BS indicates a rotational speed of the wheels 5f, 5r at which the wheels 5f, 5r do not slip even when the bucket 3 is plunged into the target to cause the vehicle body 2 to move forward. The threshold BS can be a criterion for determining whether to start slip prevention processing that drives the brake 118 so as to prevent the wheels 5f, 5r from slipping. The threshold BS is a value greater than the threshold BE described later. The threshold BS may be, for example, 6 km/h, in terms of the vehicle speed of the vehicle body 2. The threshold BS is a value set through experiments or the like, based on the shape and hardness (easiness for plunging) of the excavation target, slipperiness of the ground surface, and the like. The threshold BS is adjustable in accordance with the work site of the wheel loader 1. For example, when the ground surface where the vehicle body 2 travels is a slippery snow surface or the like, the threshold BS is adjusted to be a value smaller than normal. For example, when the target is light, such as sawdust, to which plunging is easy, and has a small impact on the bucket 3, the threshold BS is adjusted to a value greater than normal. Further, the control device 120 may be configured to determine whether to start the slip prevention processing, using the vehicle speed of the vehicle body 2 and the threshold BS based on the vehicle speed, in place of the rotational speed of the wheels 5f, 5r.

In step S105, the control device 120 starts the slip prevention processing that drives the brake 118 so as to prevent the wheels 5f, 5r from slipping. The control device 120 of the present embodiment outputs, to the brake pressure control electromagnetic valve 119a, the electric signal 118s indicating a control command to apply a predetermined brake pressure to the wheels 5f, 5r. In this manner, the rotating amount of the wheels 5f, 5r decreases so that the rotational speed of the wheels 5f, 5r is decelerated. That is, by performing step S104 and step S105, the control device 120 moves the vehicle body 2 forward with the bucket 3 plunged into the target, and brakes the wheels 5f, 5r by driving the brake 118 so as to prevent the wheels 5f, 5r from slipping when the rotational speed of the wheels 5f, 5r exceeds the threshold BS.

The predetermined brake pressure to be applied to the wheels 5f, 5r may be a brake pressure that curbs the rotating amount of the wheels 5f, 5r to be within a range in which the wheels 5f, 5r do not slip against the deceleration when the vehicle body 2 decelerates due to the reaction force that the bucket 3 receives from the target.

The predetermined brake pressure can be precalculated from the specification or experiments of the wheel loader 1. For example, it is assumed that a deceleration A of the vehicle body 2 due to the reaction force from the target is −4 m/s². It is assumed that the maximum brake pressure corresponding to the maximum depression amount of the brake pedal 112 is 5 MPa and a deceleration B of the wheels 5f, 5r when the maximum brake pressure is applied to the wheels 5f, 5r is −6 m/s². It is assumed that a deceleration C of the wheels 5f, 5r relative to the ground surface when the wheels 5f, 5r slip is −3 m/s². In this case, to prevent the wheels 5f, 5r from slipping against the deceleration A of the vehicle body 2 due to the reaction force from the target, it is only necessary to generate 1/6 of the deceleration B of the wheels 5f, 5r when the maximum brake pressure is applied so as to be greater than the deceleration C of the wheels 5f, 5r relative to the ground surface while slipping. Accordingly, in this case, the predetermined brake pressure can be calculated as 5/6 MPa corresponding to 1/6 of the maximum brake pressure 5 MPa. Further, to provide a margin to prevent the wheels 5f, 5r from slipping due to an error, the predetermined brake pressure can be calculated as 1 MPa corresponding to 1/5 of the maximum brake pressure 5 MPa.

Note that the deceleration A of the vehicle body 2 due to the reaction force from the target, the deceleration B of the wheels 5f, 5r when the maximum brake pressure is applied, and the deceleration C of the wheels 5f, 5r relative to the ground surface while slipping can be precalculated from the specification or experiments of the wheel loader 1. The deceleration C of the wheels 5f, 5r relative to the ground surface while slipping may be calculated such that the acceleration of the wheels 5f, 5r relative to the ground surface while slipping is set to be negative.

When the rotating amount of the wheels 5f, 5r significantly exceeds the moving amount of the wheels 5f, 5r relative to the ground surface, the wheels 5f, 5r slip. Therefore, the aforementioned technique of calculating the predetermined brake pressure aims to reduce the rotating amount of the wheels 5f, 5r by driving the brake 118. Simultaneously, the aforementioned technique of calculating the predetermined brake pressure aims at enabling the wheels 5f, 5r to obtain propulsion from the ground surface, without excessively reducing the rotating amount of the wheels 5f, 5r by driving the brake 118. The propulsion that the wheels 5f, 5r obtain from the ground surface increases proportionally to a difference between the rotating amount of the wheels 5f, 5r and the moving amount of the wheels 5f, 5r relative to the ground surface. However, when the difference is excessively large, the wheels 5f, 5r slip and whereby the propulsion obtained from the ground surface rapidly decreases.

The moving amount of the wheels 5f, 5r relative to the ground surface can be calculated based on the vehicle speed of the vehicle body 2 before the bucket 3 is plunged into the target and the deceleration A of the vehicle body 2 due to the reaction force from the target. The rotating amount of the wheels 5f, 5r can be calculated from the rotational speed of the wheels 5f, 5r measured by the speed sensor 21.

In the aforementioned example, when deceleration is made at 4/6 (i.e., −4 m/s$^2$) of the deceleration B (i.e., −6 m/s$^2$) of the wheels 5f, 5r when the maximum brake pressure is applied, the difference between the rotating amount of the wheels 5f, 5r and the moving amount of the wheels 5f, 5r relative to the ground surface is zero. In this case, the wheels 5f, 5r cannot obtain the propulsion from the ground surface, and thus the case is inappropriate. Further, when deceleration is made at 0/6 (i.e., 0 m/s$^2$) of the deceleration B of the wheels 5f, 5r when the maximum brake pressure is applied, the difference between the rotating amount of the wheels 5f, 5r and the moving amount of the wheels 5f, 5r relative to the ground surface remains at a value corresponding to −4 m/s$^2$ and is smaller than the value corresponding to the deceleration C (i.e., −3 m/s$^2$) of the wheels 5f, 5r relative to the ground surface while slipping. In this case, the wheels 5f, 5r slip, and thus, the case is inappropriate. When deceleration is made at 1/6 (i.e., −1 m/s$^2$) of the deceleration B of the wheels 5f, 5r when the maximum brake pressure is applied, the difference between the rotating amount of the wheels 5f, 5r and the moving amount of the wheels 5f, 5r relative to the ground surface is around the limit value within a range in which the wheels 5f, 5r do not slip. When the rotating amount of the wheels 5f, 5r is curved to be around the limit value within the range in which the wheels 5f, 5r do not slip, the propulsion that the wheels 5f, 5r obtain from the ground surface increases. In this manner, the control device 120 can plunge the bucket 3 into the target at a deep position (position in the recess of the target). The control device 120 can contain a large amount of target in the bucket 3 by lifting and rotating in the crowding direction of the bucket 3, and can secure the maximum loading amount by the bucket 3 in the excavation operation each time. Therefore, the control device 120 can minimize the number of times of performing the excavation operation in the excavation work.

In step S106, the control device 120 determines whether the rotational speed of the wheels 5f, 5r is equal to or smaller than the threshold BE. When the rotational speed of the wheels 5f, 5r is equal to or smaller than the threshold BE, the control device 120 moves on to step S107. When the rotational speed of the wheels 5f, 5r exceeds the threshold BE, step S106 may be repeated, for example, every 0.1 second until the rotational speed of the wheels 5f, 5r becomes equal to or smaller than the threshold BE. The threshold BE indicates the rotational speed of the wheels 5f, 5r at which the vehicle body 2 moves forward even receiving the reaction force from the bucket 3 plunged into the target. The threshold BE can be a criterion for determining whether to end the slip prevention processing.

The threshold BE may be a value smaller than the threshold BS by 3 km/h in terms of the vehicle speed, for example. In this manner, the control device 120 can apply the predetermined brake pressure to the wheels 5f, 5r while the vehicle speed decelerates by 3 km/h. By changing the threshold BE, the control device 120 can indirectly change the time at which the predetermined brake pressure is applied to the wheels 5f, 5r. Further, the control device 120 may be configured to determine whether to end the slip prevention processing, using the vehicle speed of the vehicle body 2 and the threshold BE based on the vehicle speed, in place of the rotational speed of the wheels 5f, 5r.

In step S107, the control device 120 ends the slip prevention processing started in step S105. When the slip prevention processing ends, the brake 118 stops driving. That is, by performing step S106 and step S107, the control device 120 maintains the rotational speed of the wheels 5f, 5r at the threshold BE or greater so as to move the vehicle body 2 forward even with the bucket 3 plunged into the target. After ending the slip prevention processing, the control device 120 rotates the bucket 3 in the crowding direction to bring the bucket 3 into a loaded state and stops lifting when the bucket 3 has reached a predetermined height. Thereafter, the control device 120 ends the processing shown in FIG. 4.

As described above, the control device 120 of Embodiment 1 is a control device for the wheel loader 1 that excavates a target by moving the vehicle body 2 forward with the rotation of the wheels 5f, 5r to plunge the bucket 3 into the target. The control device 120 of Embodiment 1 moves the vehicle body 2 forward with the bucket 3 plunged into the target, and brakes the wheels 5f, 5r when the rotational speed of the wheels 5f, 5r exceeds the predetermined threshold BS.

In this manner, the control device 120 of Embodiment 1 can move the vehicle body 2 forward by obtaining the propulsion from the ground surface without slipping the wheels 5f, 5r even with the bucket 3 plunged into the target. The control device 120 of Embodiment 1 can secure the maximum loading amount of the bucket 3 in the excavation operation each time by lifting and rotating in the crowding direction of the bucket 3. Therefore, the control device 120 of Embodiment 1 can minimize the number of times of performing the excavation operation in the excavation work. Accordingly, the control device 120 of Embodiment 1 can improve the productivity of the excavation work by reducing the work time required for the excavation work.

Further, the control device 120 performs the automatic excavation processing in which the traveling of the vehicle body 2 and the posture of the bucket 3 are controlled to automatically perform the excavation operation of the wheel loader 1. The excavation operation performed by the automatic excavation processing is the operation in which the lifting of the bucket 3 plunged into the target is started while moving the vehicle body 2 forward and after braking the wheels 5f, 5r, the bucket 3 is rotated in the crowding direction to be brought into a loaded state, and when the bucket 3 has reached a predetermined height, the lifting is stopped.

In this manner, the control device 120 of Embodiment 1 can cause the wheel loader 1 to perform the excavation operation without depending on the operation by the operator and thus, can prevent a longer time required for the excavation operation each time depending on the skill of the operator. In addition, the control device 120 of Embodiment 1 can surely secure the loading amount of the bucket 3 in the excavation operation each time. Therefore, the control device 120 of Embodiment 1 can reduce the time required for the entire excavation operation in the excavation work. Accordingly, the control device 120 of Embodiment 1 can further improve the productivity of the excavation work by further reducing the work time required for the excavation work.

Further, the control device 120 of Embodiment 1 includes the enablement determination section 123 that determines whether the automatic excavation processing is enabled and the start determination section 124 that determines whether to start the automatic excavation processing. The enablement determination section 123 determines that the automatic excavation processing is enabled when the bucket 3 is in the excavation posture within a predetermined range and the vehicle body 2 is moving forward. The start determination section 124 determines to start the automatic excavation processing when the enablement determination section 123 determines that the automatic excavation processing is enabled, the bucket 3 is in the excavation posture, and the pressure of the lift cylinder 12 that performs lifting has changed to exceed a predetermined pressure.

In this manner, the control device 120 of Embodiment 1 can cause the wheel loader 1 to appropriately perform the excavation operation by starting the automatic excavation processing after the bucket 3 is surely plunged into the target. That is, the control device 120 of Embodiment 1 can prevent a malfunction of the automatic excavation processing being started before the bucket 3 is plunged into the target, thereby disabling the wheel loader 1 to appropriately perform the excavation operation. The control device 120 of Embodiment 1 can prevent a longer time required for the excavation operation due to such a malfunction. Accordingly, the control device 120 of Embodiment 1 can surely improve the productivity of the excavation work by surely reducing the work time required for the excavation work.

Further, when the enablement determination section 123 determines that the automatic excavation processing is enabled, the control device 120 of Embodiment 1 causes the wheel loader 1 to perform the preparation operation for the automatic excavation processing before the start determination section 124 determines whether to start the automatic excavation processing.

In this manner, the control device 120 of Embodiment 1 can reduce the response time of the lift cylinder 12 after the start determination section 124 determines to start the automatic excavation processing until the lift cylinder 12 actually expands or contracts. Therefore, since the control device 120 of Embodiment 1 can immediately start lifting the bucket 3 performed in the automatic excavation processing, the time required for the excavation operation in the excavation work can be reduced. Accordingly, the control device 120 of Embodiment 1 can further improve the productivity of the excavation work by further reducing the work time required for the excavation work.

Further, the control device 120 of Embodiment 1 moves the vehicle body 2 forward while maintaining the vehicle speed of the vehicle body 2 at a predetermined speed or greater before the bucket 3 is plunged into the target.

In this manner, since the control device 120 of Embodiment 1 does not decelerate the vehicle speed of the vehicle body 2 before the bucket 3 is plunged into the target, the time required for the travel operation in the excavation work can be reduced. Accordingly, the control device 120 of Embodiment 1 can further improve the productivity of the excavation work by further reducing the work time required for the excavation work.

Embodiment 2

Using FIG. 5, the control device 120 for the wheel loader 1 according to Embodiment 2 will be described. For the configurations and operations of the control device 120 of Embodiment 2 that are the same as those of Embodiment 1, the description will be omitted.

Figure 5:
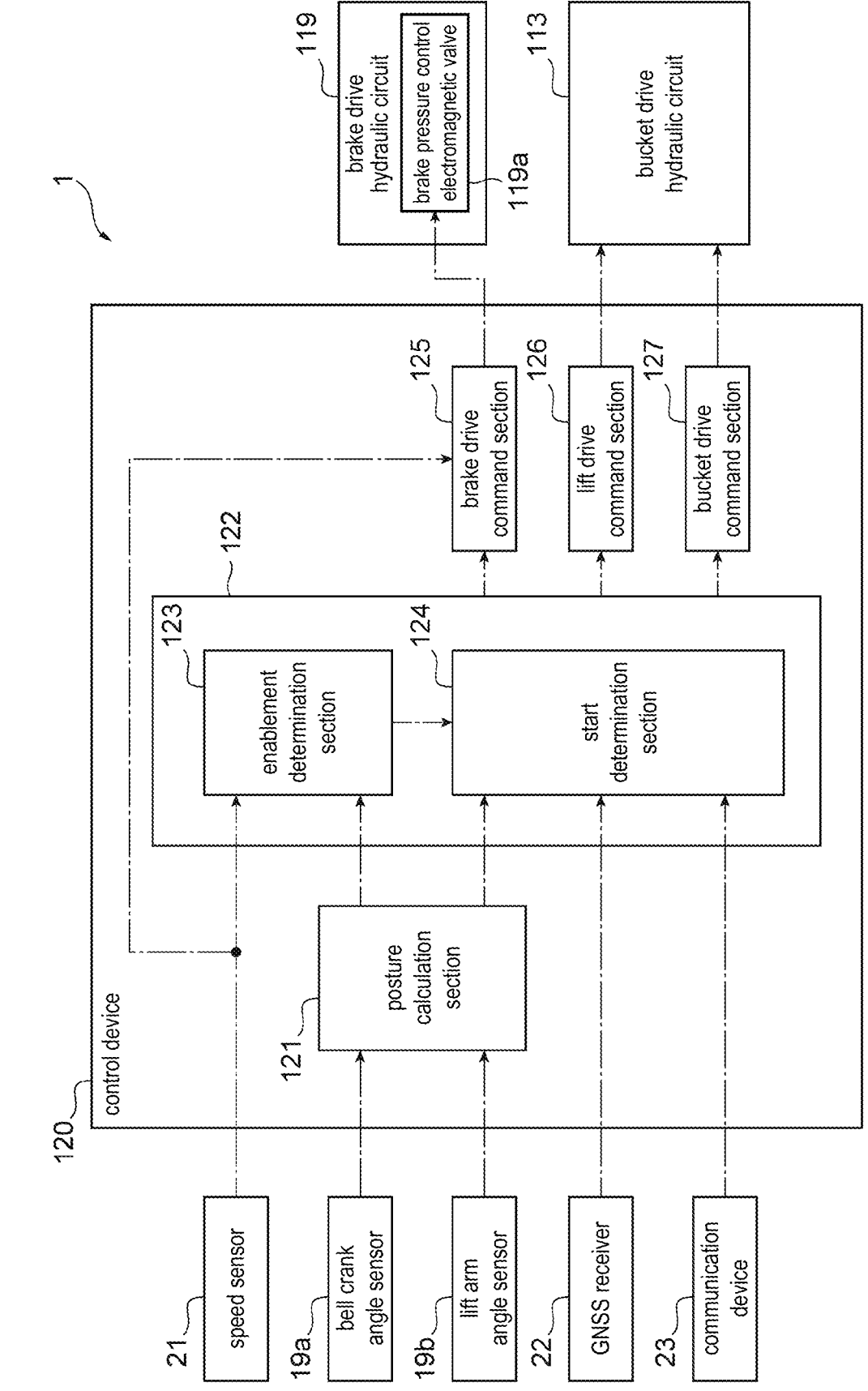
FIG. 5 is a block diagram showing the functional configuration of the control device of Embodiment 2.

FIG. 5 is a block diagram showing the functional configuration of the control device 120 of Embodiment 2.

The control device 120 of Embodiment 1 adopts the pressure of the lift cylinder 12 as one of the criteria for the start determination section 124 determining the start of the automatic excavation processing. The control device 120 of Embodiment 2 may adopt a relative distance between the bucket 3 and a target as one of the criteria for the start determination section 124 determining the start of the automatic excavation processing.

As shown in FIG. 5, the wheel loader 1 of Embodiment 2 includes a GNSS receiver 22 that receives position information of the vehicle body 2, and a communication device 23 that acquires position information of a target through communication with an external device. In step S103 of FIG. 4, the start determination section 124 of Embodiment 2 performs processing different from that of Embodiment 1. That is, the start determination section 124 of Embodiment 2 calculates position information of the bucket 3 from the position information of the vehicle body 2 and calculates a relative distance between the bucket 3 and the target from the position information of the bucket 3 and the position information of the target. Then, when the enablement determination section 123 determines that the automatic excavation processing is enabled, the bucket 3 is in the excavation posture, and the relative distance between the bucket 3 and the target is equal to or smaller than a predetermined distance, the start determination section 124 of Embodiment 2 determines to start the automatic excavation processing.

The predetermined distance may be, for example, 1 m. When it is assumed that the predetermined distance is 1 m, the threshold BS is 6 km/h in terms of the vehicle speed, and the vehicle speed of the vehicle body 2 is 6 km/h or greater, the bucket 3 is plunged into the target in about 0.5 seconds or shorter, but the automatic excavation processing is started and the slip prevention processing is started. When it is assumed that the time after starting the slip prevention processing until the brake force actually acts on the wheels 5f, 5r is about 0.5 seconds, the brake force acts on the wheels 5f, 5r after the bucket 3 is plunged into the target. Therefore, in such a case also, the impact on the excavation operation performed by the automatic excavation processing is very small. Accordingly, it is effective for the start determination section 124 of Embodiment 2 to adopt the relative distance between the bucket 3 and the target being equal to or smaller than the predetermined distance as one of the criteria for determining the start of the automatic excavation processing.

The control device 120 of Embodiment 2, similarly to Embodiment 1, can move the vehicle body 2 forward by obtaining the propulsion from the ground surface without slipping the wheels 5f, 5r. Therefore, the control device 120 of Embodiment 2 can improve the productivity of the excavation work by reducing the work time required for the excavation work.

Note that the wheel loader 1 of Embodiment 2 may include a terminal device to which the position information of the target can be input, in place of the communication device 23 that acquires the position information of the target through communication with an external device. The start determination section 124 of Embodiment 2 may acquire the position information of the target from the terminal device.

Embodiment 3

Using FIG. 6, the control device 120 for the wheel loader 1 according to Embodiment 3 will be described. For the configurations and operations of the control device 120 of Embodiment 3 that are the same as those of Embodiment 1, the description will be omitted.

Figure 6:
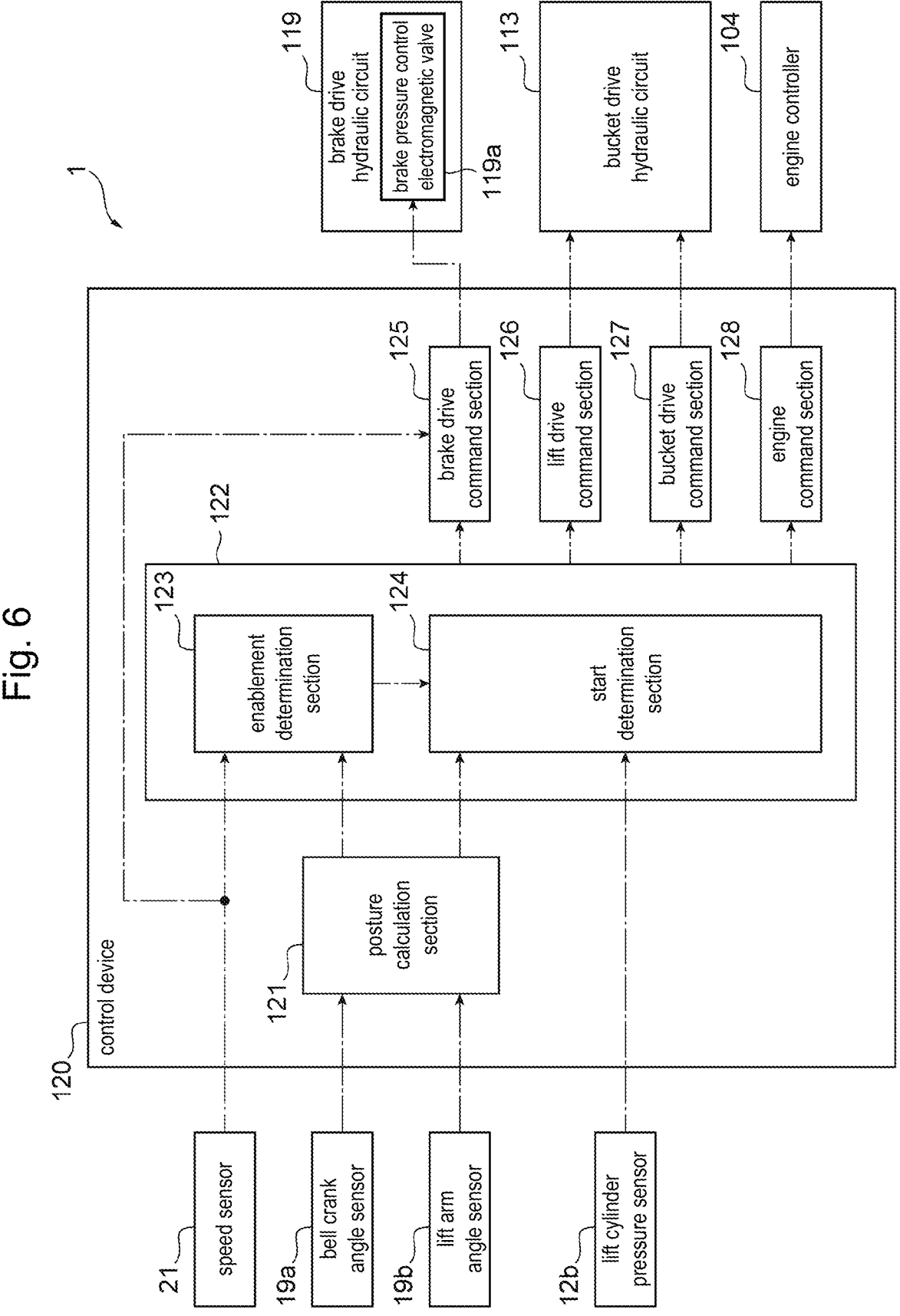
FIG. 6 is a block diagram showing the functional configuration of the control device of Embodiment 3.

FIG. 6 is a block diagram showing the functional configuration of the control device 120 of Embodiment 3.

The control device 120 of Embodiment 1 adopts braking the wheels 5f, 5r by driving the brake 118, as a means for decelerating the rotational speed of the wheels 5f, 5r in the slip prevention processing. The control device 120 of Embodiment 3 may adopt reducing the output of the power source for the wheels 5f, 5r as well as braking the wheels 5f, 5r as a means for decelerating the rotational speed of the wheels 5f, 5r in the slip prevention processing. The reducing the output of the power source for the wheels 5f, 5r may be, for example, reducing the engine speed of the engine 100.

As shown in FIG. 6, the control device 120 of Embodiment 3 further includes an engine command section 128. The engine command section 128 calculates a reduction amount (correction amount) of the engine speed of the engine 100 based on the output from the automatic excavation processing section 122 and generates a control command to the engine controller 104. The engine command section 128 generates the electric signal 106s indicating the generated control command and outputs the electric signal 106s to the engine controller 104.

The control device 120 of Embodiment 3 performs, in step S105 of FIG. 4, processing different from that of Embodiment 1. That is, the control device 120 of Embodiment 3 not only outputs the electric signal 118s indicating the control command regarding the aforementioned brake pressure to the brake pressure control electromagnetic valve 119a, but also outputs the electric signal 106s indicating the control command to reduce the engine speed of the engine 100 to the engine controller 104. The control command to reduce the engine speed of the engine 100 may be, for example, a control command to perform correction such as reducing the engine speed of the engine 100 by 300 turns than normal.

In this manner, the control device 120 of Embodiment 3 brakes the wheels 5f, 5r and also reduces the output of the power source for the wheels 5f, 5r when the rotational speed of the wheels 5f, 5r exceeds the threshold BS.

In this manner, the control device 120 of Embodiment 3 can more efficiently suppress the rotational speed of the wheels 5f, 5r in the slip prevention processing as compared to Embodiment 1 and thus, can further prevent the wheels 5f, 5r from slipping. Accordingly, the control device 120 of Embodiment 3 can further improve the productivity of the excavation work by further reducing the work time required for the excavation work, as compared to Embodiment 1.

Embodiment 4

Using FIG. 7, the control device 120 for the wheel loader 1 according to Embodiment 4 will be described. For the configurations and operations of the control device 120 of Embodiment 4 that are the same as those of Embodiment 1, the description will be omitted.

Figure 7:
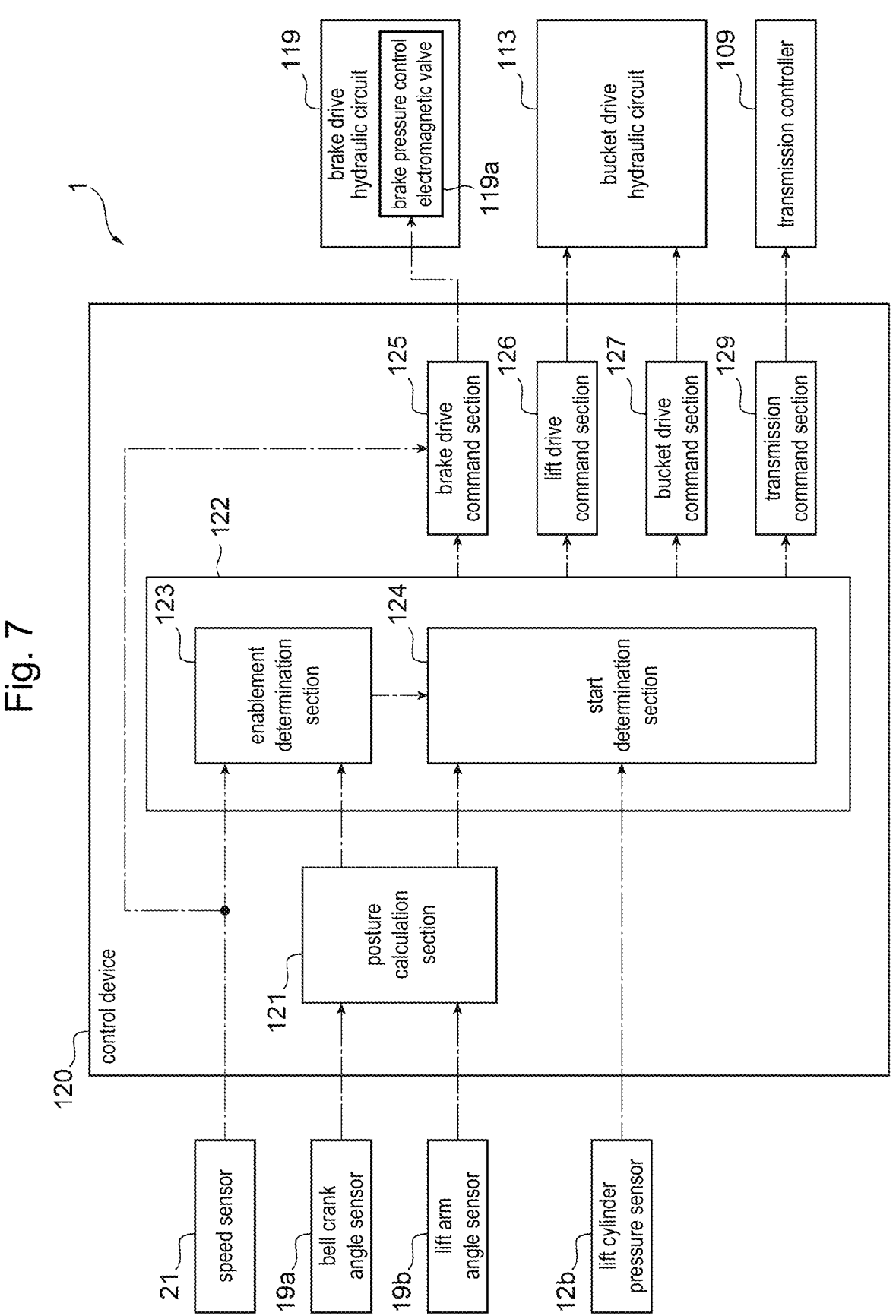
FIG. 7 is a block diagram showing the functional configuration of the control device of Embodiment 4.

FIG. 7 is a block diagram showing the functional configuration of the control device 120 of Embodiment 4.

The control device 120 of Embodiment 4 may adopt cutting the transmission of power from the power source for the wheels 5f, 5r to the wheels 5f, 5r as well as braking the wheels 5f, 5r, as a means for decelerating the rotational speed of the wheels 5f, 5r in the slip prevention processing. The cutting of the transmission of power from the power source for the wheels 5f, 5r to the wheels 5f, 5r may be, for example, cutting of the transmission of power from the engine 100 as a power source for the wheels 5f, 5r to the wheels 5f, 5r. Specifically, the cutting of the transmission of power from the power source for the wheels 5f, 5r to the wheels 5f, 5r may be cutting, at the transmission 107, the connection between the output shaft of the torque converter 101 and the drive shaft 108.

As shown in FIG. 7, the control device 120 of Embodiment 4 further includes a transmission command section 129. The transmission command section 129 generates a control command to cut the connection between the output shaft of the torque converter 101 and the drive shaft 108, based on the output from the automatic excavation processing section 122. The transmission command section 129 generates the electric signal 107s indicating the generated control command and outputs the electric signal 107s to the transmission controller 109.

The control device 120 of Embodiment 4 performs, in step S105 of FIG. 4, processing different from that of Embodiment 1. That is, the control device 120 of Embodiment 4 not only outputs the electric signal 118s indicating the control command regarding the aforementioned brake pressure to the brake pressure control electromagnetic valve 119a, but also outputs the signal 107s indicating the control command to cut the connection between the output shaft of the torque converter 101 and the drive shaft 108 to the transmission controller 109. This corresponds to the transmission 107 being shifted to neutral, and cuts the transmission of power from the engine 100 to the wheels 5f, 5r.

In this manner, when the rotational speed of the wheels 5f, 5r exceeds the threshold BS, the control device 120 of Embodiment 4 brakes the wheels 5f, 5r and also cuts the transmission of power from the power source to the wheels 5f, 5r to the wheels 5f, 5r.

In this manner, the control device 120 of Embodiment 4 can more efficiently suppress the rotational speed of the wheels 5f, 5r in the slip prevention processing as compared to Embodiment 1 and thus, can further prevent the wheels 5f, 5r from slipping. Accordingly, the control device 120 of Embodiment 4 can further improve the productivity of the excavation work by further reducing the work time required for the excavation work, as compared to Embodiment 1.

The embodiments of the present invention have been described above in detail, but the present invention is not limited to the aforementioned embodiments, and various changes are available within the range without departing from the spirit of the present invention described in the scope of claims. In the present invention, the configuration of an embodiment can be added to or replaced with the configuration of another embodiment or a part of the configuration of an embodiment can be deleted.

REFERENCE SIGNS LIST

1 wheel loader
2 vehicle body
3 bucket
5f front wheels
5r rear wheels
12 lift cylinder
100 engine
107 transmission
118 brake (brake device)
120 control device
123 enablement determination section
124 start determination section
BS threshold

The invention claimed is:

1. A control device for a wheel loader that excavates a target by moving a vehicle body forward with rotation of wheels to plunge a bucket into the target, wherein the control device moves the vehicle body forward with the bucket plunged into the target, and brakes the wheels when a rotational speed of the wheels exceeds a predetermined threshold, such that a difference between a rotating amount of the wheels calculated from the rotational speed of the wheels and a moving amount of the wheels relative to a ground surface calculated based on a speed of the vehicle body before the bucket is plunged into the target and a deceleration of the vehicle body due to a reaction force from the target is within a range of a limit value in which the wheels do not slip.

2. The control device for a wheel loader according to claim 1, wherein the control device performs automatic excavation processing in which traveling of the vehicle body and a posture of the bucket are controlled to automatically perform an excavation operation of the wheel loader, and the excavation operation performed in the automatic excavation processing is an operation in which lifting of the bucket plunged into the target is started while moving the vehicle body forward, the bucket is rotated in a crowding direction to be brought into a loaded state after braking the wheels, and the lifting is stopped when the bucket reaches a predetermined height.

3. The control device for a wheel loader according to claim 2, comprising:

an enablement determination section that determines whether the automatic excavation processing is enabled; and a start determination section that determines whether to start the automatic excavation processing, wherein the enablement determination section determines that the automatic excavation processing is enabled when the bucket is in an excavation posture within a predetermined range and the vehicle body is moving forward, and the start determination section determines to start the automatic excavation processing when the enablement determination section determines that the automatic excavation processing is enabled, the bucket is in the excavation posture, and a pressure of a lift cylinder that performs the lifting changes to exceed a predetermined pressure.

4. The control device for a wheel loader according to claim 2, comprising:

an enablement determination section that determines whether the automatic excavation processing is enabled; and a start determination section that determines whether to start the automatic excavation processing, wherein the enablement determination section determines that the automatic excavation processing is enabled when the bucket is in an excavation posture within a predetermined range and the vehicle body is moving forward, and the start determination section determines to start the automatic excavation processing when the enablement determination section determines that the automatic excavation processing is enabled, the bucket is in the excavation posture, and a relative distance between the bucket and the target is equal to or smaller than a predetermined distance.

5. The control device for a wheel loader according to claim 3, wherein when the enablement determination section determines that the automatic excavation processing is enabled, the control device causes the wheel loader to perform a preparation operation for the automatic excavation processing, before the start determination section determines whether to start the automatic excavation processing.

6. The control device for a wheel loader according to claim 1, wherein the control device moves the vehicle body forward maintaining a vehicle speed of the vehicle body at a predetermined speed or greater before the bucket is plunged into the target.

7. The control device for a wheel loader according to claim 1, wherein when the rotational speed of the wheels exceeds the threshold, the control device brakes the wheels and reduces an output of a power source for the wheels.

8. The control device for a wheel loader according to claim 1, wherein when the rotational speed of the wheels exceeds the threshold, the control device brakes the wheels and cuts transmission of power from a power source for the wheels to the wheels.

9. The control device for a wheel loader according to claim 4, wherein when the enablement determination section determines that the automatic excavation processing is enabled, the control device causes the wheel loader to perform a preparation operation for the automatic excavation processing, before the start determination section determines whether to start the automatic excavation processing.

* * * * *